(12) United States Patent
Shiraishi (10) Patent No.: US 9,228,613 B2
(45) Date of Patent: Jan. 5, 2016

(54) BICYCLE BOTTOM BRACKET ASSEMBLY (71) Applicant: SHIMANO INC., Sakai (JP)

(72) Inventor: Shingo Shiraishi, Sakai (JP)

(73) Assignee: SHIMANO INC., Sakai (JP)

( * ) Notice: Subject to any disclaimer, the term of this patent is extended or adjusted under 35 U.S.C. 154(b) by 42 days.

(21) Appl. No.: 14/188,546

(22) Filed: Feb. 24, 2014

(65) Prior Publication Data
US 2015/0240875 A1 Aug. 27, 2015

(51) Int. Cl.
B62K 19/34 (2006.01)
F16C 19/54 (2006.01)
B62M 3/00 (2006.01)
B62M 1/36 (2013.01)
F16C 35/077 (2006.01)

(52) U.S. Cl.
CPC ............. *F16C 35/077* (2013.01); *B62K 19/34* (2013.01); *B62M 3/003* (2013.01); *Y10T 74/2164* (2015.01)

(58) Field of Classification Search
CPC ...... F16C 19/185; F16C 19/225; F16C 19/54; F16C 35/061; B60B 27/0005; B60B 27/0078; B60B 27/023; B62K 19/34; Y10T 74/2164
USPC .................. 384/458, 504, 510, 513, 517, 526, 384/538–540, 547, 545; 280/256, 259; 74/594.1, 594.2
See application file for complete search history.

(56) References Cited

U.S. PATENT DOCUMENTS

| | | | | |
|---|---|---|---|---|
| 3,578,829 A * | 5/1971 | Hata et al. | | 384/458 |
| 4,406,504 A * | 9/1983 | Coenen et al. | | 384/545 |
| 4,606,658 A * | 8/1986 | Hofmann et al. | | 384/510 |
| 5,281,003 A * | 1/1994 | Herman | | 301/2.5 |
| 5,597,242 A * | 1/1997 | Beeler | | 384/517 |
| 5,975,768 A * | 11/1999 | Hoffman et al. | | 384/545 |
| 5,984,528 A | 11/1999 | Ohtsu | | |
| 6,014,913 A * | 1/2000 | Masahiro | | 74/594.1 |
| 6,938,516 B2 * | 9/2005 | Yamanaka | | 74/594.1 |
| 6,983,672 B2 * | 1/2006 | Smith | | 74/594.1 |
| 7,503,700 B2 * | 3/2009 | Yamanaka et al. | | 384/545 |
| 7,650,817 B2 * | 1/2010 | Shiraishi et al. | | 74/594.1 |
| 8,453,538 B2 * | 6/2013 | Mola et al. | | 74/594.1 |
| 2007/0194620 A1 * | 8/2007 | Kanehisa | | 301/110.5 |
| 2007/0204722 A1 * | 9/2007 | Dal Pra | | 74/594.1 |
| 2007/0207631 A1 * | 9/2007 | Meggiolan et al. | | 439/55 |
| 2007/0241530 A1 * | 10/2007 | Nonoshita et al. | | 280/259 |
| 2008/0247695 A1 * | 10/2008 | Yamanaka | | 384/458 |
| 2009/0145262 A1 * | 6/2009 | Pasqua et al. | | 74/594.1 |
| 2009/0261553 A1 * | 10/2009 | Meggiolan | | 280/259 |

FOREIGN PATENT DOCUMENTS

DE 10216940 11/2003

* cited by examiner

*Primary Examiner* — Marcus Charles
(74) *Attorney, Agent, or Firm* — Mori & Ward, LLP (57) ABSTRACT

A bicycle bottom bracket assembly comprises a first adapter, a first bearing, a second adapter and a second bearing. The first adapter extends along a first center axis of the first adapter. The first bearing comprises first rolling elements and a first outer race. The first outer race is configured to be fitted in the first adapter. The first outer race is slidable relative to the first adapter in both axial directions along the first center axis in a state where the first outer race is fitted in the first adapter. The second adapter extends along a second center axis of the second adapter. The second bearing comprises second rolling elements and a second outer race. The second outer race is configured to be provided in the second adapter such that the second outer race is a separate member from the first outer race.

14 Claims, 11 Drawing Sheets

BICYCLE BOTTOM BRACKET ASSEMBLY

BACKGROUND OF THE INVENTION

1. Field of the Invention

The present invention relates to a bicycle bottom bracket assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle bottom bracket assembly.

SUMMARY OF THE INVENTION

In accordance with a first aspect of the present invention, a bicycle bottom bracket assembly comprises a first adapter, a first bearing, a second adapter and a second bearing. The first adapter has a cylindrical shape and extends along a first center axis of the first adapter. The first bearing comprises first rolling elements and a first outer race. The first outer race is configured to contact the first rolling elements and is configured to be fitted in the first adapter. The first outer race is slidable relative to the first adapter in both axial directions along the first center axis in a state where the first outer race is fitted in the first adapter. The second adapter has a cylindrical shape and extends along a second center axis of the second adapter. The second bearing comprises second rolling elements and a second outer race. The second outer race is configured to contact the second rolling elements and is configured to be provided in the second adapter such that the second outer race is a separate member from the first outer race.

In accordance with a second aspect of the present invention, the bicycle bottom bracket assembly according to the first aspect is configured so that the first outer race is configured to be press-fitted in the first adapter.

In accordance with a third aspect of the present invention, the bicycle bottom bracket assembly according to the first aspect is configured so that the first adapter includes an axial surface configured to face the first outer race along the first center axis with a gap in a state where the first outer race is fitted in the first adapter.

In accordance with a fourth aspect of the present invention, the bicycle bottom bracket assembly according to the first aspect is configured so that the first adapter includes a first main-body and a first extending portion. The first main-body includes a first bearing support portion configured to contact the first outer race in a state where the first outer race is fitted in the first adapter. The first extending portion extends from the first bearing support portion along the first center axis.

In accordance with a fifth aspect of the present invention, the bicycle bottom bracket assembly according to the fourth aspect is configured so that the second adapter includes a second main-body and a second extending portion. The second main-body includes a second bearing support portion configured to contact the second outer race in a state where the second outer race is provided in the second adapter. The second extending portion extends from the second bearing support portion along the second center axis. The first extending portion at least partly overlaps with the second extending portion when viewed from a radial direction perpendicular to the first center axis in a state where the first adapter and the second adapter are mounted to a bottom bracket shell of a bicycle frame.

In accordance with a sixth aspect of the present invention, the bicycle bottom bracket assembly according to the fourth aspect is configured so that the first main-body includes a first tool engaging portion with which a tool is to engage to rotate the first adapter relative to a bottom bracket shell of a bicycle frame.

In accordance with a seventh aspect of the present invention, the bicycle bottom bracket assembly according to the fourth aspect is configured so that the first main-body includes a first contact portion configured to contact one of a bottom bracket shell of a bicycle frame and a spacer provided between the first contact portion and the bottom bracket shell.

In accordance with an eighth aspect of the present invention, the bicycle bottom bracket assembly according to the fourth aspect is configured so that the first main-body includes a first seal supporting portion configured to contact a first seal member.

In accordance with a ninth aspect of the present invention, the bicycle bottom bracket assembly according to the eighth aspect further comprises the first seal member configured to contact the first seal supporting portion.

In accordance with a tenth aspect of the present invention, the bicycle bottom bracket assembly according to the eighth aspect is configured so that the first adapter includes an axial surface configured to face the first outer race along the first center axis with a gap in a state where the first outer race is press-fitted in the first adapter. The axial surface is provided at the first seal supporting portion.

In accordance with an eleventh aspect of the present invention, the bicycle bottom bracket assembly according to the first aspect is configured so that the first adapter comprises a resin material.

In accordance with a twelfth aspect of the present invention, the bicycle bottom bracket assembly according to the first aspect further comprises a crank shaft including a first groove configured to contact the first rolling elements.

In accordance with a thirteenth aspect of the present invention, the bicycle bottom bracket assembly according to the first aspect is configured so that the second adapter comprises a resin material. The second outer race is partly embedded in the second adapter to be prevented from moving relative to the second adapter in the both axial directions along the second center axis.

In accordance with a fourteenth aspect of the present invention, the bicycle bottom bracket assembly according to the thirteenth aspect is configured so that the second outer race is partly embedded in the second adapter by an integral molding process.

In accordance with a fifteenth aspect of the present invention, a bicycle bottom bracket assembly comprises an adapter and a bearing. The adapter has a cylindrical shape and extends along a center axis of the adapter. The adapter comprises a resin material. The bearing comprises rolling elements and an outer race. The outer race is configured to contact the rolling elements and is configured to be provided in the adapter. The outer race is partly embedded in the adapter to be prevented from moving relative to the adapter in both axial directions along the center axis.

In accordance with a sixteenth aspect of the present invention, the bicycle bottom bracket assembly according to the fifteenth aspect is configured so that the adapter includes a main-body and an extending portion. The main-body includes a bearing support portion configured to contact the outer race. The extending portion extends from the bearing support portion along the center axis.

In accordance with a seventeenth aspect of the present invention, the bicycle bottom bracket assembly according to the sixteenth aspect further comprises an additional adapter and an additional bearing. The additional adapter has a cylindrical shape and extends along an additional center axis of the additional adapter. The additional bearing comprises additional rolling elements and an additional outer race. The additional outer race is configured to contact the additional rolling elements and is configured to be fitted in the additional adapter. The additional adapter includes an additional main-body including an additional bearing support portion configured to contact the additional outer race, and an additional extending portion extending from the additional bearing support portion along the additional center axis. The additional extending portion at least partly overlaps with the extending portion when viewed from a radial direction perpendicular to the additional center axis in a state where the additional adapter and the adapter are mounted to a bottom bracket shell of a bicycle frame.

In accordance with an eighteenth aspect of the present invention, the bicycle bottom bracket assembly according to the sixteenth aspect is configured so that the main-body includes a tool engaging portion with which a tool is to engage to rotate the adapter relative to a bottom bracket shell of a bicycle frame.

In accordance with a nineteenth aspect of the present invention, the bicycle bottom bracket assembly according to the sixteenth aspect is configured so that the main-body includes a contact portion configured to contact one of a bottom bracket shell of a bicycle frame and a spacer provided between the contact portion and the bottom bracket shell.

In accordance with a twentieth aspect of the present invention, the bicycle bottom bracket assembly according to the sixteenth aspect is configured so that the main-body includes a seal supporting portion configured to contact a seal member.

In accordance with a twenty-first aspect of the present invention, the bicycle bottom bracket assembly according to the twenty aspect further comprises a seal member configured to contact the seal supporting portion.

In accordance with a twenty-second aspect of the present invention, the bicycle bottom bracket assembly according to the fifteenth aspect further comprises a crank shaft including a groove configured to contact the rolling elements.

In accordance with a twenty-third aspect of the present invention, the bicycle bottom bracket assembly according to the fifteenth aspect is configured so that the adapter includes a main-body including a bearing support portion configured to contact the outer race. The bearing support portion comprises the resin material and includes a first contact surface and a second contact surface. The second contact surface is spaced apart from the first contact surface along the center axis. The outer race is provided between the first contact surface and the second contact surface along the center axis and includes a first axial end surface and a second axial end surface. The first axial end surface contacts the first contact surface. The second axial end surface contacts the second contact surface.

In accordance with a twenty-fourth aspect of the present invention, the bicycle bottom bracket assembly according to the twenty-third aspect is configured so that the bearing support portion includes an inner circumferential surface provided between the first contact surface and the second contact surface along the center axis. The outer race includes an outer circumferential surface contacting the inner circumferential surface of the bearing support portion.

In accordance with a twenty-fifth aspect of the present invention, the bicycle bottom bracket assembly according to the fifteenth aspect is configured so that the outer race is partly embedded in the adapter by an integral molding process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
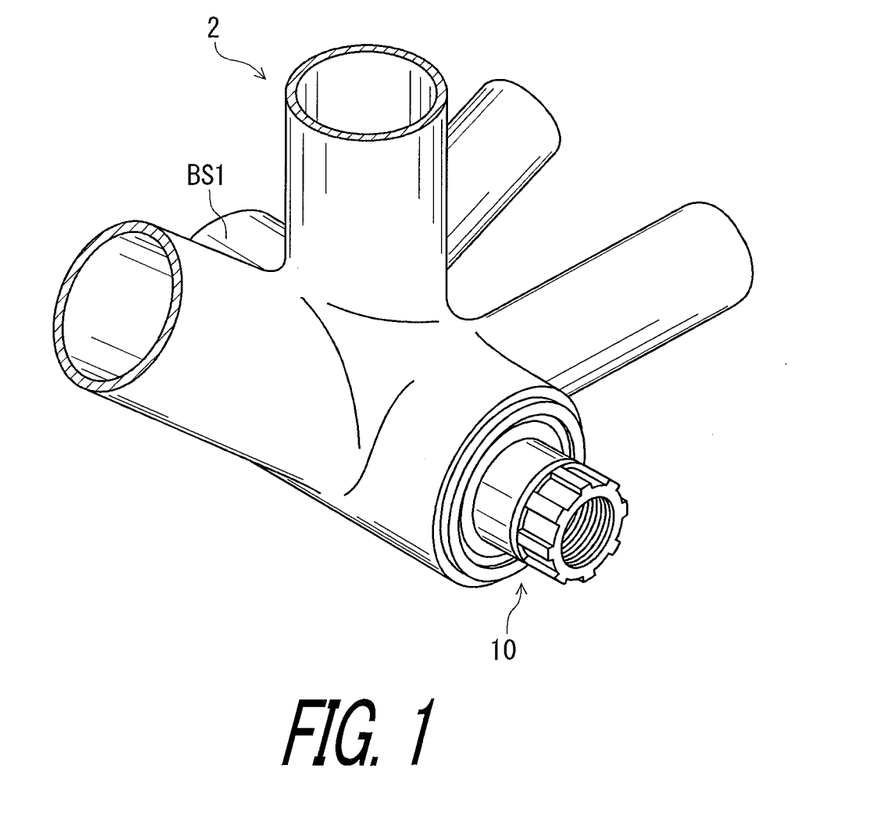
FIG. 1 is a partial perspective view of a bicycle frame to which a bicycle bottom bracket assembly in accordance with a first embodiment is mounted.

Referring initially to FIG. 1, a bicycle bottom bracket assembly 10 in accordance with one embodiment is illustrated. The bicycle bottom bracket assembly 10 is configured to be mounted to a bottom bracket shell BS1 of a bicycle frame 2. The bottom bracket shell BS1 has a tubular shape. Since the bicycle frame 2 includes structures which are well known in the bicycle field, they will not be described and/or illustrated in detail here for the sake of brevity.

Figure 2:
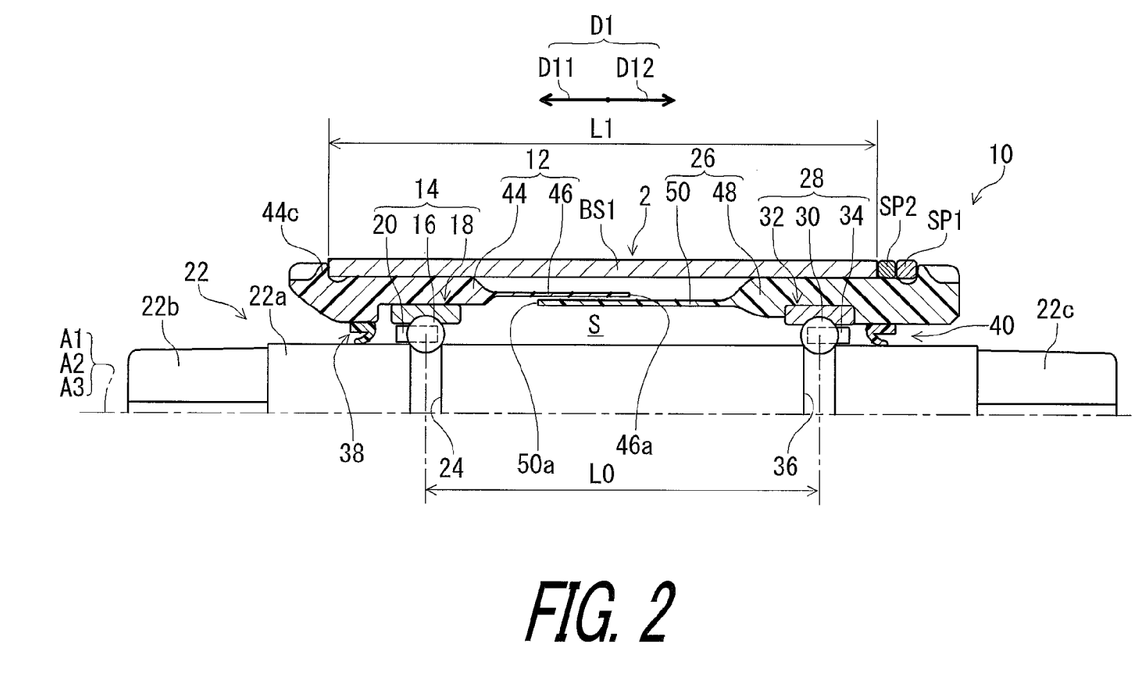
FIG. 2 is partial a cross-sectional view of the bicycle bottom bracket assembly mounted to the bicycle frame illustrated in FIG. 1.

As seen in FIG. 2, the bicycle bottom bracket assembly 10 comprises a first adapter or an additional adapter 12 (hereinafter referred to as the first adapter 12), and a first bearing or an additional bearing 14 (hereinafter referred to as the first bearing 14). The first adapter 12 has a cylindrical shape and extends along a first center axis or an additional center axis A1 (hereinafter referred to as the first center axis A1) of the first adapter 12. For example, the first adapter 12 comprises a resin material.

The first bearing 14 comprises first rolling elements or additional rolling elements 16 (hereinafter referred to as the first rolling elements 16), and a first outer race or an additional outer race 18 (hereinafter referred to as the first outer race 18). For example, the first rolling elements 16 are balls made of a metallic material. The first bearing 14 includes a first retainer 20 configured to rotatably retain the first rolling elements 16. The first outer race 18 is configured to contact the first rolling elements 16. For example, the first outer race 18 has an annular shape and is made of a metallic material.

The bicycle bottom bracket assembly 10 further comprises a crank shaft 22. The crank shaft 22 includes a first groove 24 configured to contact the first rolling elements 16. The first groove 24 has an annular shape and is provided on an outer peripheral surface 22a of the crank shaft 22. The first rolling elements 16 are rotatably provided between the first outer race 18 and the crank shaft 22. The crank shaft 22 includes a first end part 22b and a second end part 22c opposite to the first end part 22b. For example, a left crank arm (not shown) is secured to the first end part 22b, and a right crank arm (not shown) is secured to the second end part 22c.

In the present application, the following directional terms "forward", "rearward", "left", "right", "upward" and "downward" as well as any other similar directional terms refer to those directions which are determined on the basis of the rider who sits on a saddle (not shown) of a bicycle with facing a bicycle handlebar (not shown). Accordingly, these terms, as utilized to describe the bicycle bottom bracket assembly 10, should be interpreted relative to a bicycle equipped with the bicycle bottom bracket assembly 10 as used in an upright riding position on a horizontal surface.

As seen in FIG. 2, the first outer race 18 is configured to be fitted in the first adapter 12. The first outer race 18 is slidable relative to the first adapter 12 in both axial directions (both of a first axial direction D11 and a second axial direction D12) along the first center axis A1 in a state where the first outer race 18 is fitted in the first adapter 12. The first axial direction D11 and the second axial direction D12 are parallel to the first center axis A1 of the first adapter 12. The second axial direction D12 is opposite to the first axial direction D11. A direction including the first axial direction D11 and the second axial direction D12 is hereinafter referred to as an axial direction D1. In the illustrated embodiment, the first outer race 18 is configured to be press-fitted in the first adapter 12.

The bicycle bottom bracket assembly 10 further comprises a second adapter or an adapter 26 (hereinafter referred to as the second adapter 26), and a second bearing or a bearing 28 (hereinafter referred to as the second bearing 28). The second adapter 26 has a cylindrical shape and extends along a second center axis or a center axis A2 (hereinafter referred to as the second center axis A2) of the second adapter 26. In the illustrated embodiment, the second center axis A2 is substantially coaxial with the first center axis A1 of the first adapter 12. The first center axis A1 and the second center axis A2 are substantially coaxial with a rotational axis A3 of the bicycle bottom bracket assembly 10.

As seen in FIG. 2, the second bearing 28 comprises second rolling elements or rolling elements 30 (hereinafter referred to as the second rolling elements 30), and a second outer race or an outer race 32 (hereinafter referred to as the second outer race 32). For example, the second rolling elements 30 are balls made of a metallic material. The second bearing 28 includes a second retainer 34 configured to rotatably retain the second rolling elements 30. The second outer race 32 is configured to contact the second rolling elements 30. For example, the second outer race 32 is made of a metallic material. The second outer race 32 is configured to be provided in the second adapter 26 such that the second outer race 32 is a separate member from the first outer race 18. An axial pitch L0 is defined between centers of the first rolling elements 16 and centers of the second rolling elements 30 in the axial direction D1.

The crank shaft 22 includes a second groove or a groove 36 (hereinafter referred to as the second groove 36) configured to contact the second rolling elements 30. The second groove 36 has an annular shape and is provided on the outer peripheral surface 22a of the crank shaft 22. The second rolling elements 30 are rotatably provided between the second outer race 32 and the crank shaft 22. The crank shaft 22 is rotatably supported by the first adapter 12 and the second adapter 26 via the first bearing 14 and the second bearing 28.

As seen in FIG. 2, the bicycle bottom bracket assembly 10 further comprises a first seal member 38. The first seal member 38 has an annular shape and is provided between the first adapter 12 and the crank shaft 22. An annular space between the first adapter 12 and the crank shaft 22 is sealed by the first seal member 38. For example, the first seal member 38 is press-fitted in the first adapter 12, or bonded to the first adapter 12 by adhesive. The bicycle bottom bracket assembly 10 further comprises a second seal member or a seal member 40 (hereinafter referred to as the second seal member 40). The second seal member 40 has an annular shape and is provided between the second adapter 26 and the crank shaft 22. An annular space between the second adapter 26 and the crank shaft 22 is sealed by the second seal member 40. For example, the second seal member 40 is press-fitted in the second adapter 26, or bonded to the second adapter 26 by adhesive. The first adapter 12, the second adapter 26, the first seal member 38, the second seal member 40 and the crank shaft 22 define an internal space S in which lubricant such as grease is provided preferably.

Figure 3:
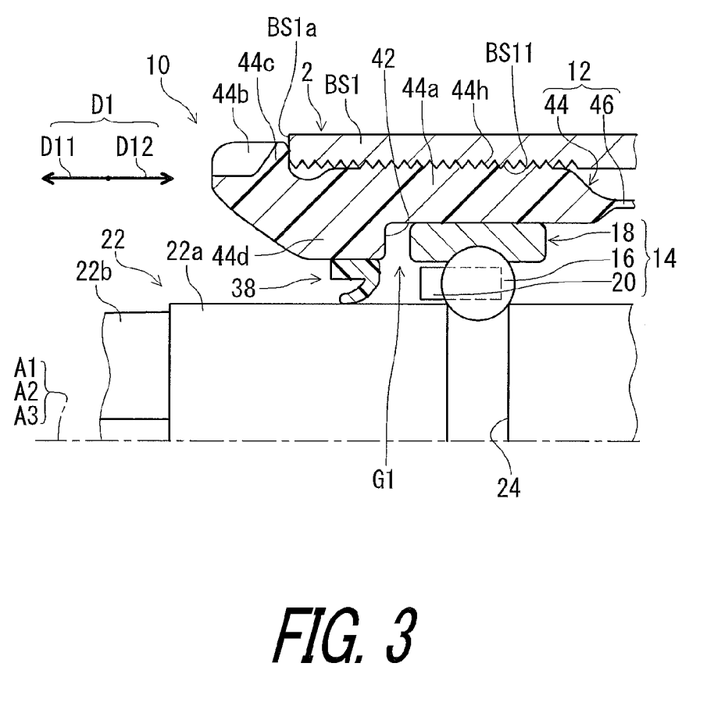
FIG. 3 is a partial cross-sectional view of the bicycle bottom bracket assembly illustrated in FIG. 2.

As seen in FIG. 3, the first adapter 12 includes an axial surface 42 configured to face the first outer race 18 along the first center axis A1 with a gap G1 in a state where the first outer race 18 is fitted in the first adapter 12. The first adapter 12 includes a first main-body 44 and a first extending portion 46. The first main-body 44 includes a first bearing support portion 44a configured to contact the first outer race 18 in a state where the first outer race 18 is fitted in the first adapter 12. The first extending portion 46 extends from the first bearing support portion 44a along the first center axis A1.

The first main-body 44 includes a first tool engaging portion 44b with which a tool is to engage to rotate the first adapter 12 relative to the bottom bracket shell BS1 of the bicycle frame 2. For example, the first tool engaging portion 44b includes teeth arranged in a circumferential direction of the first adapter 12. Possible examples of the tool include a bottom-bracket attachment tool configured to engage with the teeth of the first tool engaging portion 44b.

As seen in FIG. 3, the first main-body 44 includes a first contact portion 44c configured to contact one of the bottom bracket shell BS1 of the bicycle frame 2 and a spacer provided between the first contact portion 44c and the bottom bracket shell BS1. In the illustrated embodiment, the first contact portion 44c is configured to contact a first end surface BS1a of the bottom bracket shell BS1. However, at least one spacer can be provided between the first contact portion 44c and the bottom bracket shell BS1 if needed and/or desired. In such embodiment, the first contact portion 44c contacts the spacer provided between the first contact portion 44c and the bottom bracket shell BS1.

The first main-body 44 includes a first seal supporting portion 44d configured to contact the first seal member 38. The first seal member 38 is configured to contact the first seal supporting portion 44d. For example, the first seal member 38 is press-fitted in the first adapter 12 (specifically, in the first seal supporting portion 44d), or bonded to the first seal supporting portion 44d by adhesive. In the illustrated embodiment, the axial surface 42 is provided at the first seal supporting portion 44d.

The first main-body 44 includes a first externally threaded portion 44h configured to engage with a first internally threaded portion BS11 of the bottom bracket shell BS1. The first externally threaded portion 44h is provided on an outer circumferential surface of the first main-body 44. The first internally threaded portion BS11 is provided on an inner circumferential surface of the bottom bracket shell BS1.

Figure 4:
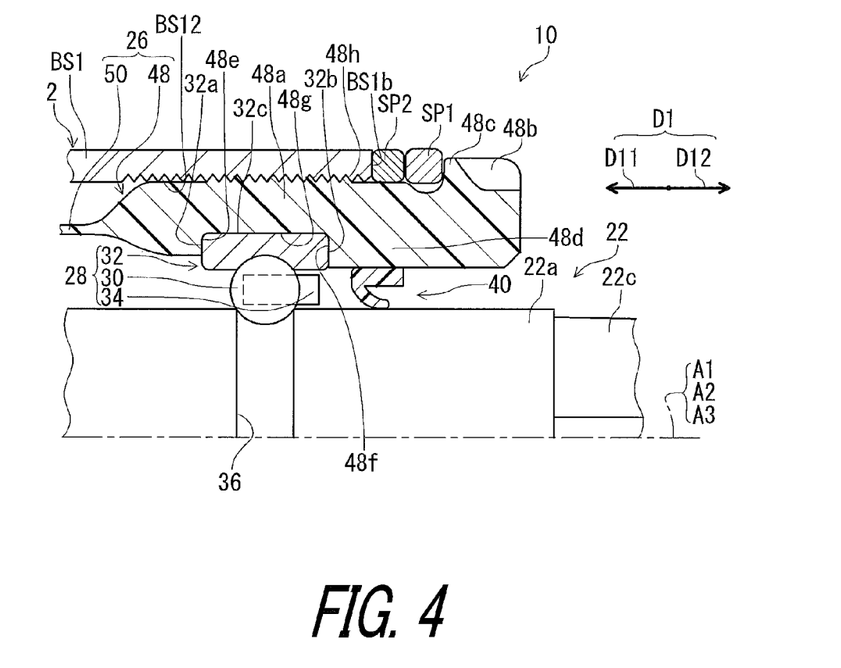
FIG. 4 is a partial cross-sectional view of the bicycle bottom bracket assembly illustrated in FIG. 2.

As seen in FIG. 4, the second adapter 26 includes a second main-body or a main-body 48 (hereinafter referred to as the second main-body 48), and a second extending portion or an extending portion 50 (hereinafter referred to as the second extending portion 50). In the case of referring the second main-body 48 as a main body 48, the first main-body 44 can be referred as an additional main-body 44. Similarly, in the case of referring the second extending portion 50 as an extending portion 50, the first extending portion 46 can be referred as an additional extending portion 46. For example, the second adapter 26 comprises a resin material. The second outer race 32 is partly embedded in the second adapter 26 to be prevented from moving relative to the second adapter 26 in the both axial directions (i.e., the first axial direction D11 and the second axial direction D12) along the second center axis A2. For example, the second outer race 32 is partly embedded in the second adapter 26 by an integral molding process.

The second main-body 48 includes a second bearing support portion or a bearing support portion 48a (hereinafter referred to as the second bearing support portion 48a) configured to contact the second outer race 32 in a state where the second outer race 32 is provided in the second adapter 26. For example, the second bearing support portion 48a comprises the resin material. In the illustrated embodiment, the second outer race 32 is partly embedded in the second bearing support portion 48a to be prevented from moving relative to the second bearing support portion 48a in the first axial direction D11 and the second axial direction D12.

As seen in FIG. 4, the second bearing support portion 48a includes a first contact surface 48e and a second contact surface 48f. The second contact surface 48f is spaced apart from the first contact surface 48e along the second center axis A2. The second outer race 32 is provided between the first contact surface 48e and the second contact surface 48f along the second center axis A2.

The second outer race 32 includes a first axial end surface 32a and a second axial end surface 32b. The second axial end surface 32b is opposite to the first axial end surface 32a in the axial direction D1. The first axial end surface 32a contacts the first contact surface 48e. The second axial end surface 32b contacts the second contact surface 48f. The second bearing support portion 48a includes an inner circumferential surface 48g provided between the first contact surface 48e and the second contact surface 48f along the second center axis A2. The second outer race 32 includes an outer circumferential surface 32c contacting the inner circumferential surface 48g of the second bearing support portion 48a.

As seen in FIG. 2, the second extending portion 50 extends from the second bearing support portion 48a along the second center axis A2. The first extending portion 46 at least partly overlaps with the second extending portion 50 when viewed from a radial direction perpendicular to the first center axis A1 in a state where the first adapter 12 and the second adapter 26 are mounted to the bottom bracket shell BS1 of the bicycle frame 2. The first extending portion 46 includes a first end surface 46a. The second extending portion 50 includes a second end surface 50a. The first end surface 46a is closer to the second main-body 48 than the second end surface 50a in a state where the bicycle bottom bracket assembly 10 is mounted to the bottom bracket shell BS1. The second end surface 50a is closer to the first main-body 44 than the first end surface 46a in a state where the bicycle bottom bracket assembly 10 is mounted to the bottom bracket shell BS1. In the illustrated embodiment, the first extending portion 46 is disposed radially outward of the second extending portion 50.

As seen in FIG. 4, the second main-body 48 includes a second tool engaging portion or a tool engaging portion 48b (hereinafter referred to as the second tool engaging portion 48b) with which a tool is to engage to rotate the second adapter 26 relative to the bottom bracket shell BS1 of the bicycle frame 2. For example, the second tool engaging portion 48b includes teeth arranged in a circumferential direction of the second adapter 26. Possible examples of the tool include a bottom-bracket attachment tool configured to engage with the teeth of the second tool engaging portion 48b.

The second main-body 48 includes a second contact portion or a contact portion 48c (hereinafter referred to as the second contact portion 48c) configured to contact one of the bottom bracket shell BS1 of the bicycle frame 2 and a spacer provided between the second contact portion 48c and the bottom bracket shell BS1. In the illustrated embodiment, the second contact portion 48c is configured to contact a spacer SP1 provided between the second contact portion 48c and the bottom bracket shell BS1. An additional spacer SP2 is provided between the spacer SP1 and the bottom bracket shell BS1. Each of the spacer SP1 and the additional spacer SP2 has an annular shape. A second end surface BS1b of the bottom bracket shell BS1 contacts the additional spacer SP2. At least one of the spacer SP1 and the additional spacer SP2 can be omitted from the bicycle bottom bracket assembly 10 if needed and/or desired. In a case where the spacer SP1 and the additional spacer SP2 are omitted from the bicycle bottom bracket assembly 10, the second contact portion 48c directly contacts the bottom bracket shell BS1.

As seen in FIG. 4, the second main-body 48 includes a second seal supporting portion or a seal supporting portion 48d (hereinafter referred to as the second seal supporting portion 48d) configured to contact the second seal member 40. The second seal member 40 is configured to contact the second seal supporting portion 48d. For example, the second seal member 40 is press-fitted in the second adapter 26 (specifically, in the second seal supporting portion 48d), or bonded to the second seal supporting portion 48d by adhesive. In the illustrated embodiment, the second contact surface 48f of the second bearing support portion 48a is provided at the second seal supporting portion 48d.

The second main-body 48 includes a second externally threaded portion 48h configured to engage with a second internally threaded portion BS12 of the bottom bracket shell BS1. The second externally threaded portion 48h is provided on an outer circumferential surface of the second main-body 48. The second internally threaded portion BS12 is provided on the inner circumferential surface of the bottom bracket shell BS1.

The method of mounting the bicycle bottom bracket assembly 10 to the bottom bracket shell BS1 will be described below referring to FIGS. 5 to 7.

Figure 5:
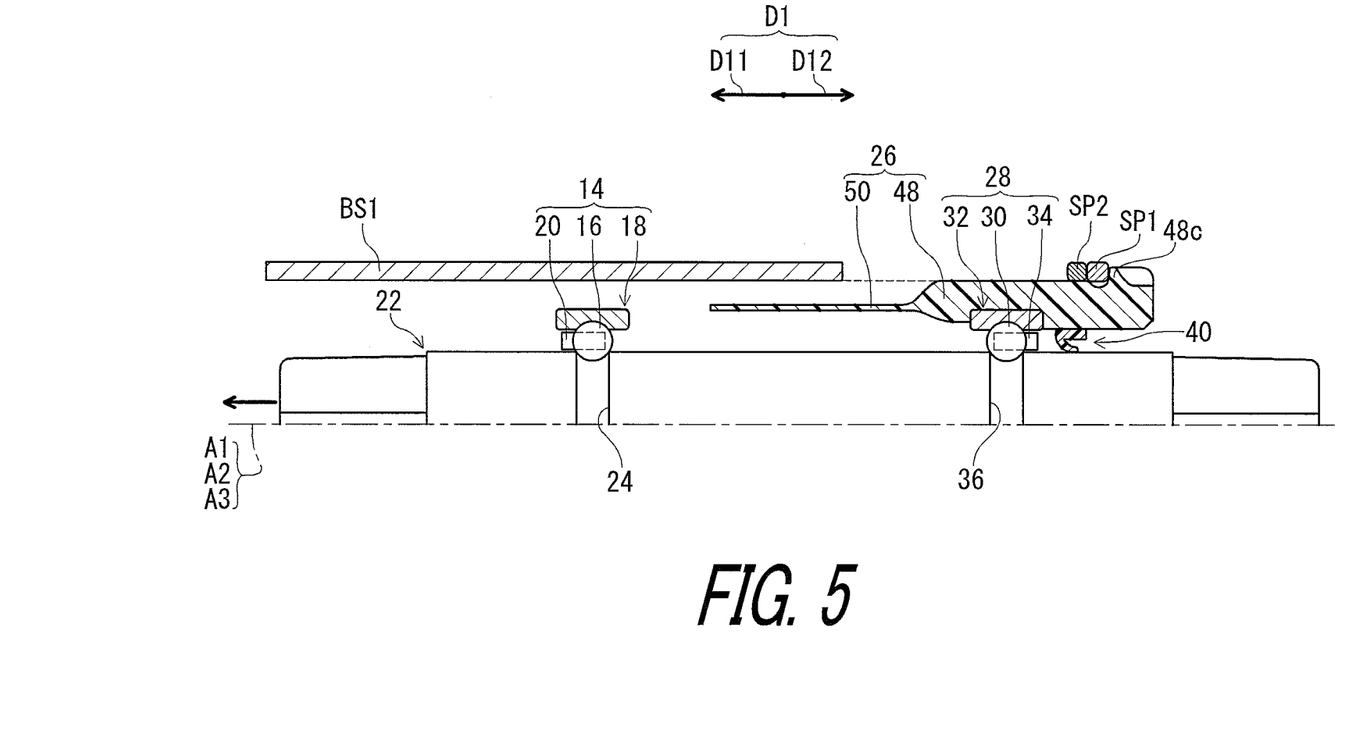
FIG. 5 is a schematic cross-sectional view showing a method of mounting the bicycle bottom bracket assembly illustrated in FIG. 2.

As seen in FIG. 5, the first bearing 14, the second bearing 28 and the second adapter 26 are assembled to the crank shaft 22 before the first adapter 12 is mounted to the crank shaft 22.

More specifically, the spacer SP1 and the additional spacer SP2 are attached on the second adapter 26.

Next, the crank shaft 22 is inserted into the bottom bracket shell BS1 together with the first bearing 14, the second bearing 28 and the second adapter 26. Since the second outer race 32 is partly embedded in the second adapter 26 and the second rolling elements 30 engage with the second outer race 32 and the second groove 36, the second adapter 26 and the second bearing 28 are integrally inserted into the bottom bracket shell BS1 with the crank shaft 22. The second adapter 26 is rotated relative to the bottom bracket shell BS1 using a tool, causing the second externally threaded portion 48h to be screwed into the second internally threaded portion BS12 of the bottom bracket shell BS1.

Figure 6:
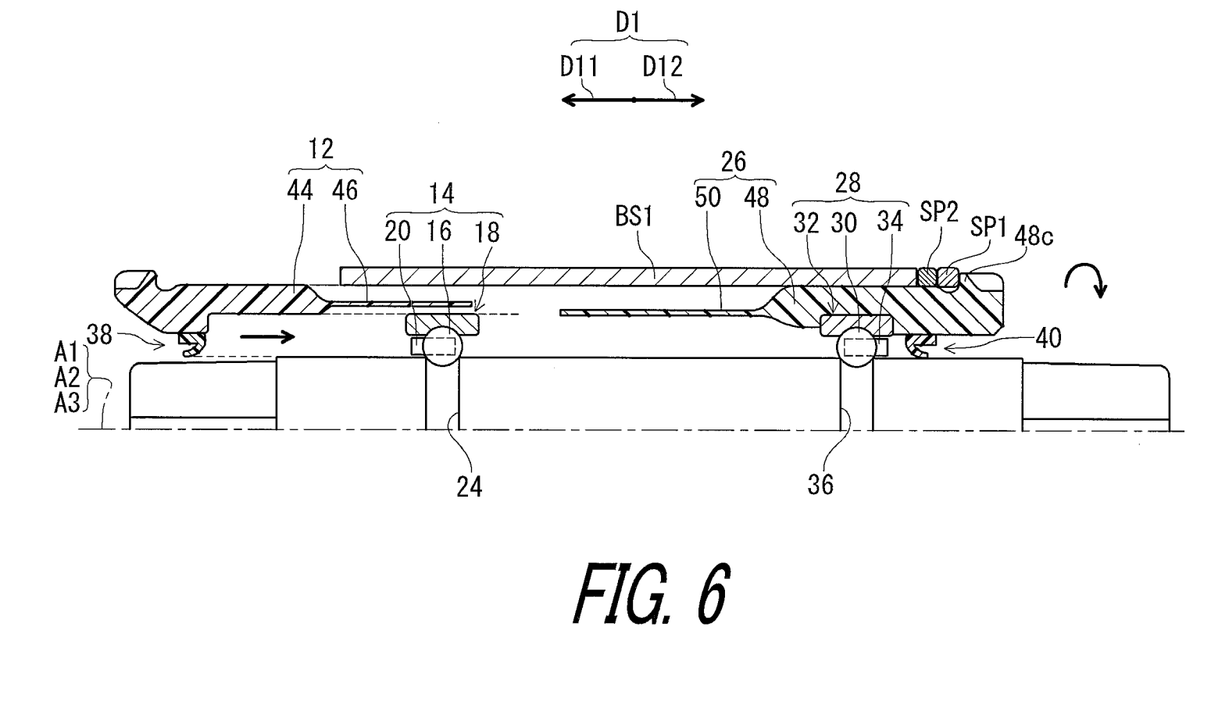
FIG. 6 is a schematic cross-sectional view showing the method of mounting the bicycle bottom bracket assembly illustrated in FIG. 2.

As seen in FIG. 6, the second adapter 26 is rotated relative to the bottom bracket shell BS1 until the spacer SP1 and the additional spacer SP2 are sandwiched between the bottom bracket shell BS1 and the second contact portion 48c of the second adapter 26. After that, the first adapter 12 is inserted into the bottom bracket shell BS1.

Figure 7:
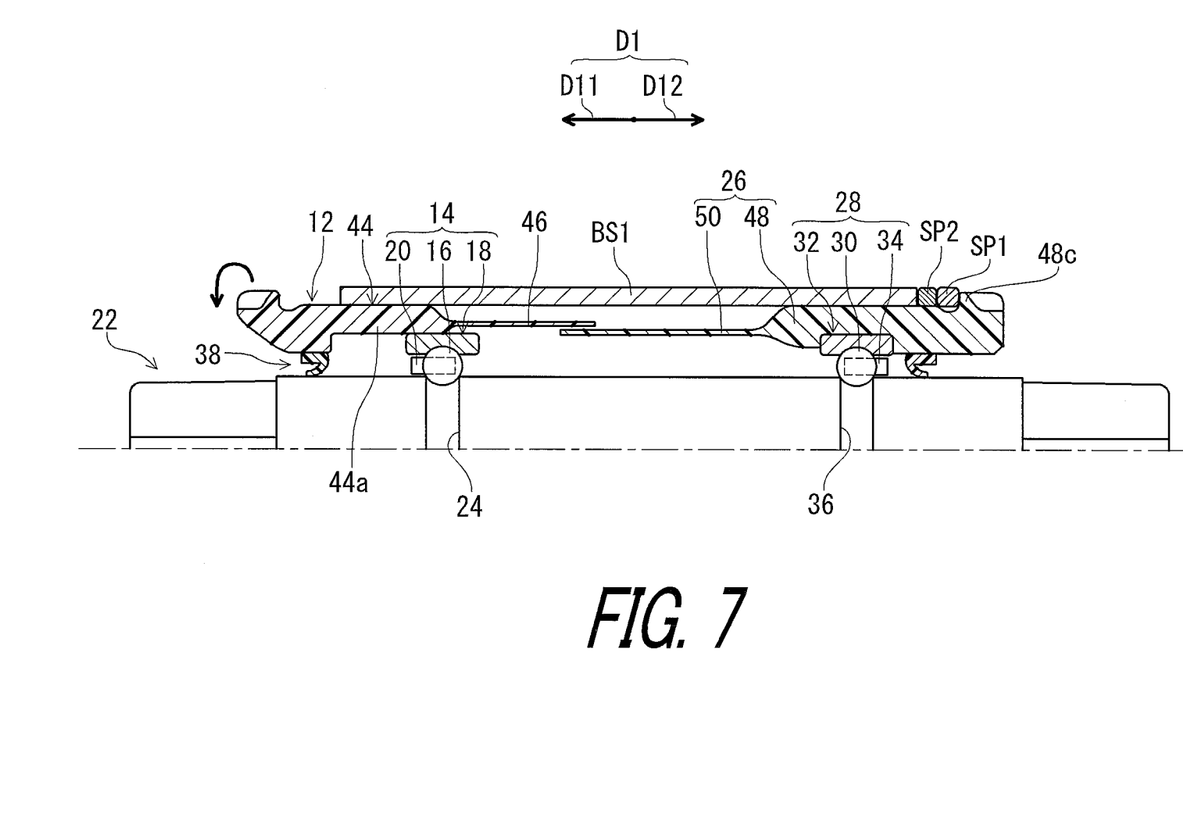
FIG. 7 is a schematic cross-sectional view showing the method of mounting the bicycle bottom bracket assembly illustrated in FIG. 2.

As seen in FIG. 7, the first adapter 12 is rotated relative to the bottom bracket shell BS1 using a tool, causing the first externally threaded portion 44h to be screwed into the first internally threaded portion BS11. This causes the first adapter 12 to gradually move relative to the bottom bracket shell BS1 in the axial direction D1. At this time, an inner peripheral surface of the first bearing support portion 44a slides with an outer peripheral surface of the first outer race 18 of the first bearing 14, causing the first outer race 18 to be press-fitted into the first adapter 12.

As seen in FIG. 2, the first adapter 12 is rotated relative to the bottom bracket shell BS1 until the first contact portion 44c of the first adapter 12 contacts the bottom bracket shell BS1. As seen in FIG. 3, the gap G1 is provided between the first outer race 18 and the axial surface 42 of the first adapter 12 in a state where the first contact portion 44c of the first adapter 12 contacts the bottom bracket shell BS1.

Figure 8:
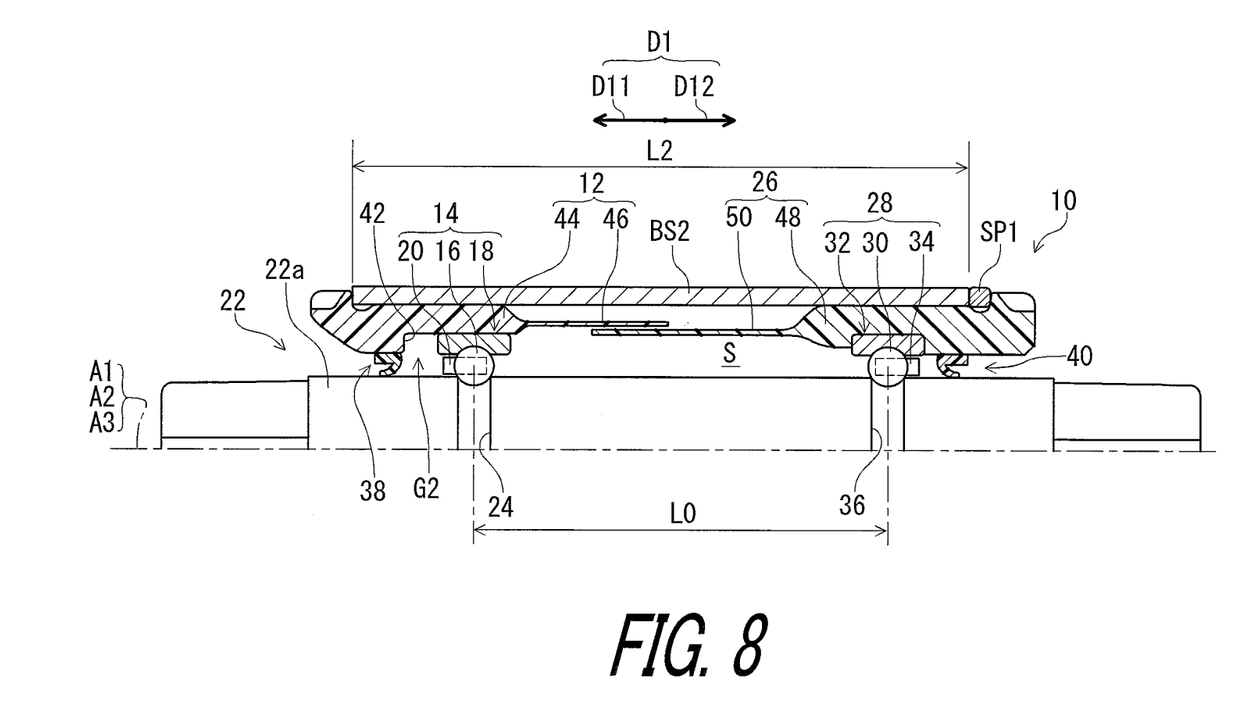
FIG. 8 is a partial cross-sectional view showing an example of the bicycle bottom bracket assembly mounted to a bottom bracket shell.

The bicycle bottom bracket assembly 10 according to the embodiment of the present invention can be mounted to several bottom bracket shells having different lengths such that it is no longer necessary to provide a plurality of different bottom bracket assemblies to fit each of such several bottom bracket shells having different lengths. As seen in FIG. 8, for example, the bicycle bottom bracket assembly 10 can be mounted to a bottom bracket shell BS2 having a second axial length L2 longer than a first axial length L1 (FIG. 2) of the bottom bracket shell BS1. In this embodiment, the additional spacer SP2 is omitted from the bicycle bottom bracket assembly 10. A gap G2 between the first outer race 18 and the axial surface 42 of the first adapter 12 is larger than the gap G1 illustrated in FIG. 3.

Figure 9:
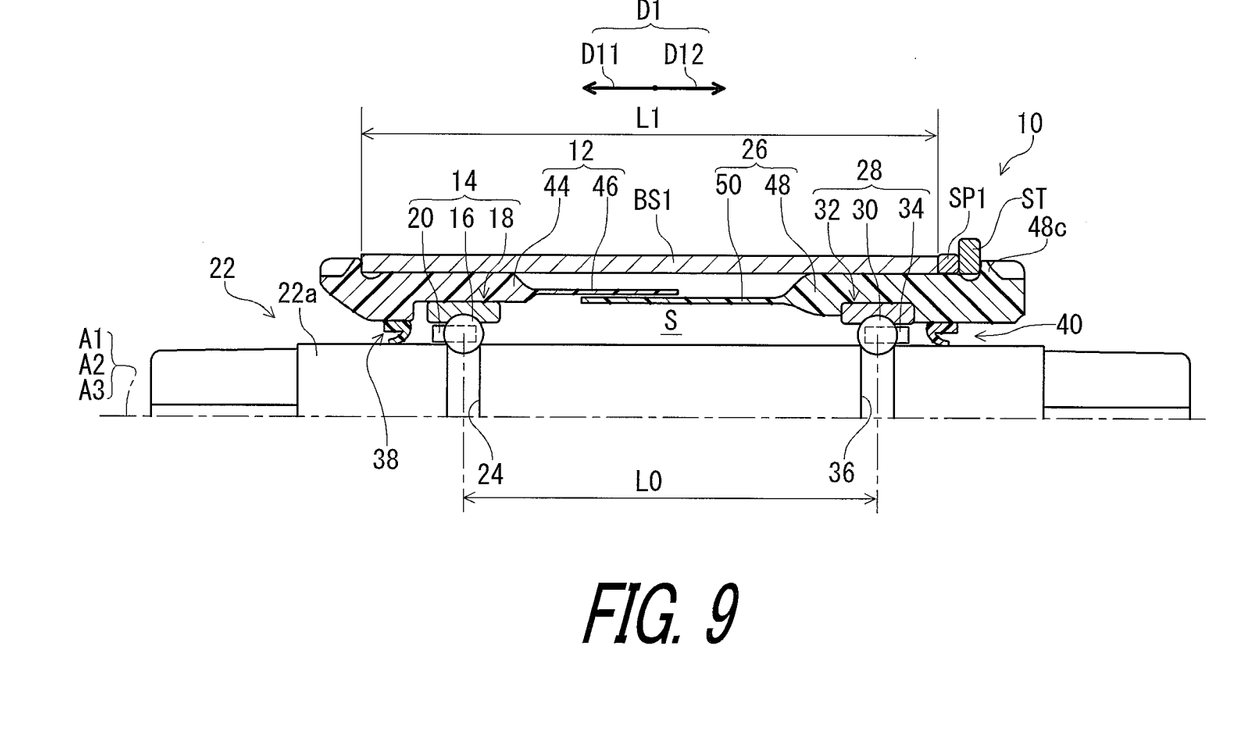
FIG. 9 is a partial cross-sectional view showing an example of the bicycle bottom bracket assembly mounted to a bottom bracket shell.

As seen in FIG. 9, the bicycle bottom bracket assembly 10 is mounted to the bottom bracket shell BS1 having the first axial length L1. In this embodiment, a derailleur mounting stay ST and the spacer SP1 is sandwiched between the bottom bracket shell BS1 and the second contact portion 48c of the second adapter 26. A front derailleur (not shown) is mounted to the derailleur mounting stay ST. The additional spacer SP2 is omitted from the bicycle bottom bracket assembly 10. Members such as the derailleur mounting stay ST can serve as a spacer provided between the bottom bracket shell BS1 and the second adapter 26.

Figure 10:
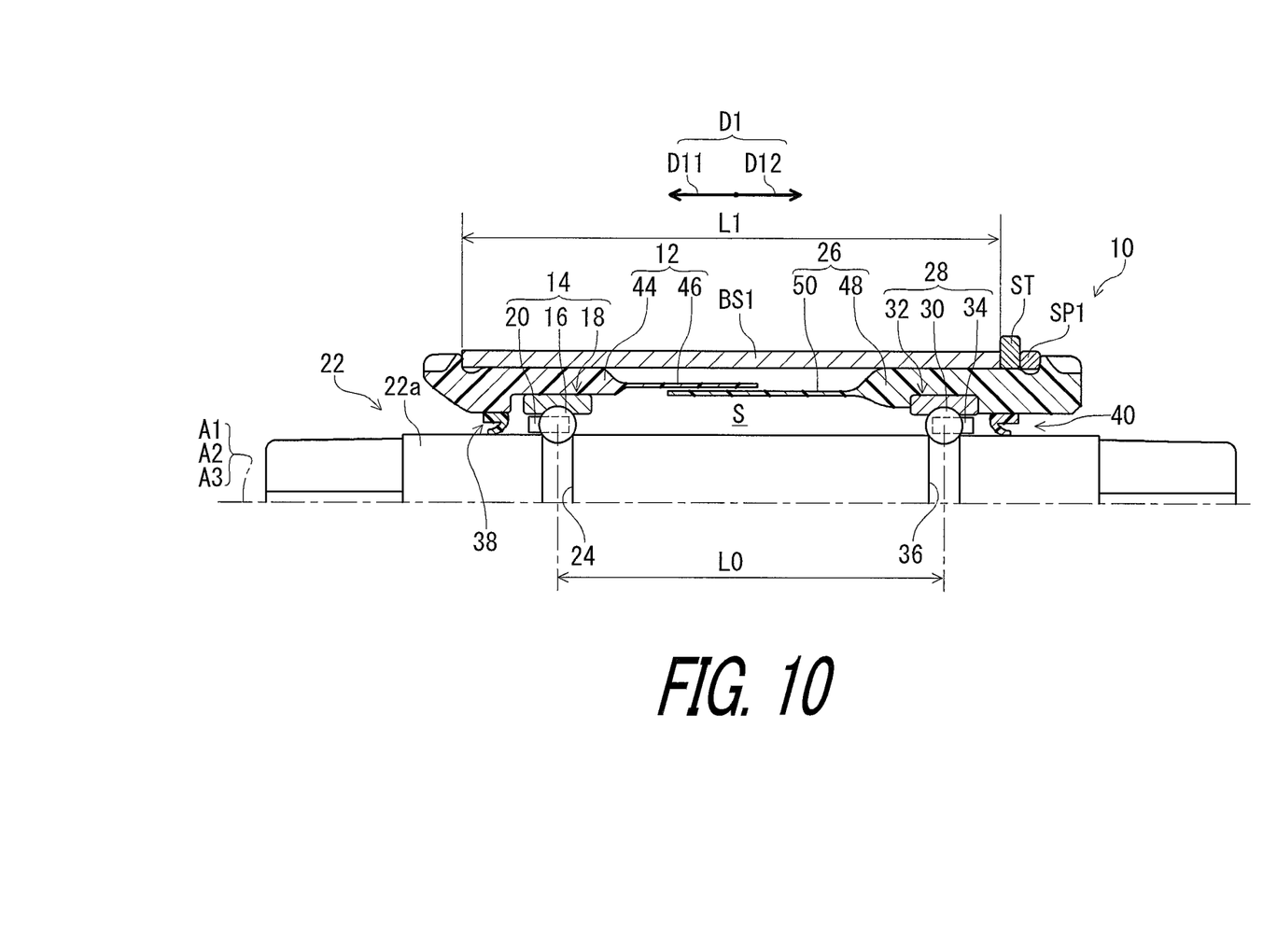
FIG. 10 is a partial cross-sectional view showing an example of the bicycle bottom bracket assembly mounted to a bottom bracket shell.

As seen in FIG. 10, the bicycle bottom bracket assembly 10 is mounted to the bottom bracket shell BS1 having the first axial length L1. The positions of the derailleur mounting stay ST and the spacer SP1 are changed relative to each other comparing with the arrangement illustrated in FIG. 9. The derailleur mounting stay ST contacts the bottom bracket shell BS1, and the spacer SP1 contacts the second contact portion 48c of the second adapter 26.

Figure 11:
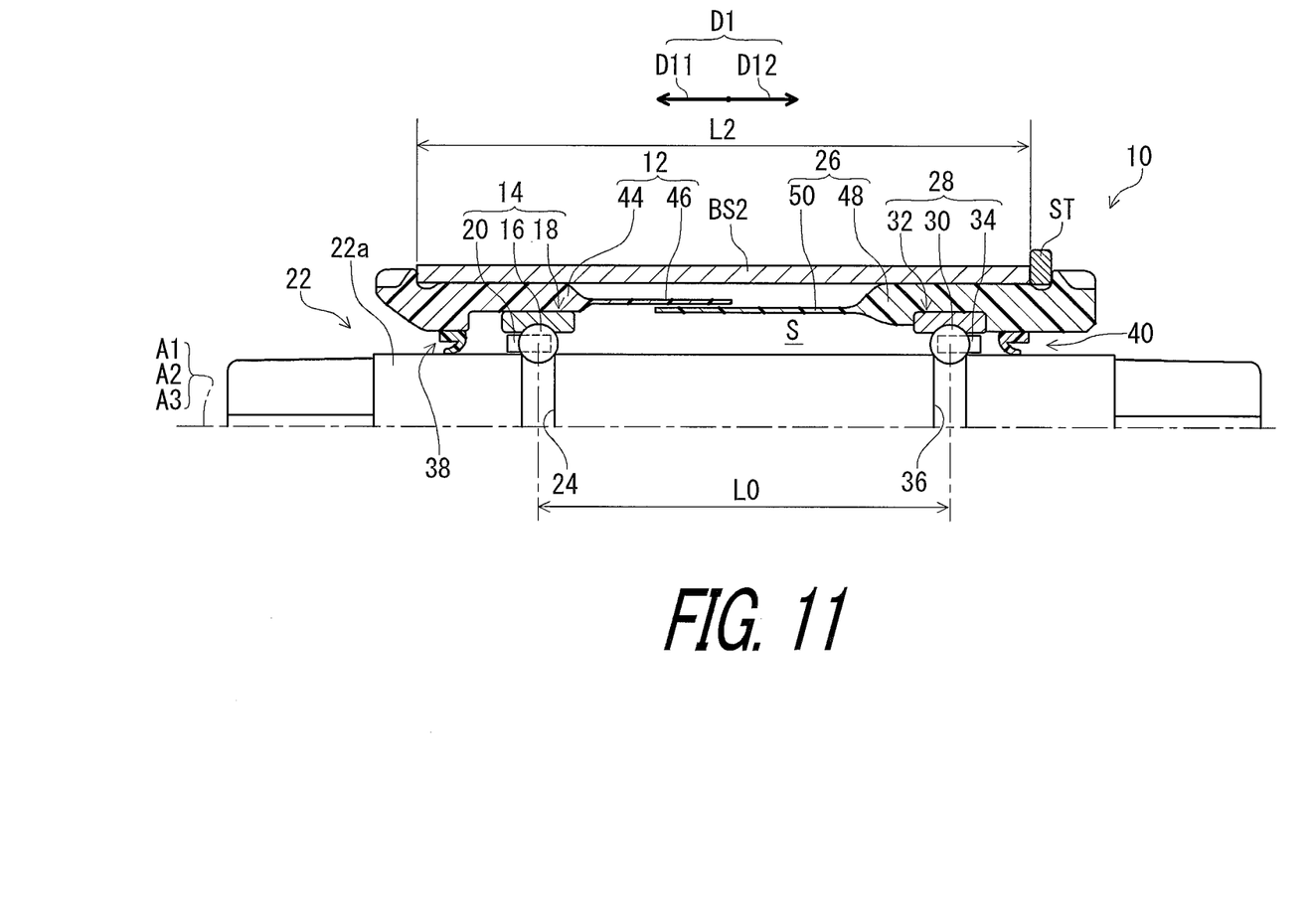
FIG. 11 is a partial cross-sectional view showing an example of the bicycle bottom bracket assembly mounted to a bottom bracket shell.

As seen in FIG. 11, the bicycle bottom bracket assembly 10 is mounted to the bottom bracket shell BS2 having the second axial length L2. The derailleur mounting stay ST is sandwiched between the bottom bracket shell BS2 and the second contact portion 48c of the second adapter 26. The spacer SP1 and the additional spacer SP2 are omitted from the bicycle bottom bracket assembly 10.

As discussed above, the bicycle bottom bracket assembly 10 can be mounted to several bottom bracket shells having different axial lengths, improving the versatility of the bicycle bottom bracket assembly 10.

Furthermore, with the bicycle bottom bracket assembly 10, since the second outer race 32 is partly embedded in the second adapter 26 to be prevented from moving relative to the second adapter 26 in both of the first axial direction D11 and the second axial directions D12 along the second center axis A2, it is possible to simplify the coupling structure between the second adapter 26 and the second outer race 32. This allows the manufacturing cost of the bicycle bottom bracket assembly 10 to be reduced.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle bottom bracket assembly comprising:
a first adapter having a cylindrical shape and extending along a first center axis of the first adapter;
a first bearing comprising:
first rolling elements; and
a first outer race configured to contact the first rolling elements and configured to be fitted in the first adapter, the first outer race being slidable relative to the first adapter in both axial directions along the first center axis in a state where the first outer race is fitted in the first adapter;
a second adapter having a cylindrical shape and extending along a second center axis of the second adapter; and
a second bearing comprising:
second rolling elements; and
a second outer race configured to contact the second rolling elements and configured to be provided in the second adapter such that the second outer race is a separate member from the first outer race.

2. The bicycle bottom bracket assembly according to claim 1, wherein
the first outer race is configured to be press-fitted in the first adapter.

3. The bicycle bottom bracket assembly according to claim 1, wherein
the first adapter includes an axial surface configured to face the first outer race along the first center axis with a gap in a state where the first outer race is fitted in the first adapter.

4. The bicycle bottom bracket assembly according to claim 1, wherein
the first adapter includes
a first main-body including a first bearing support portion configured to contact the first outer race in a state where the first outer race is fitted in the first adapter, and
a first extending portion extending from the first bearing support portion along the first center axis.

5. The bicycle bottom bracket assembly according to claim 4, wherein
the second adapter includes
a second main-body including a second bearing support portion configured to contact the second outer race in a state where the second outer race is provided in the second adapter, and
a second extending portion extending from the second bearing support portion along the second center axis, and
the first extending portion at least partly overlaps with the second extending portion when viewed from a radial direction perpendicular to the first center axis in a state where the first adapter and the second adapter are mounted to a bottom bracket shell of a bicycle frame.

6. The bicycle bottom bracket assembly according to claim 4, wherein
the first main-body includes a first tool engaging portion with which a tool is to engage to rotate the first adapter relative to a bottom bracket shell of a bicycle frame.

7. The bicycle bottom bracket assembly according to claim 4, wherein
the first main-body includes a first contact portion configured to contact one of a bottom bracket shell of a bicycle frame and a spacer provided between the first contact portion and the bottom bracket shell.

8. The bicycle bottom bracket assembly according to claim 4, wherein
the first main-body includes a first seal supporting portion.

9. The bicycle bottom bracket assembly according to claim 8, further comprising:
a first seal member configured to contact the first seal supporting portion.

10. The bicycle bottom bracket assembly according to claim 8, wherein
the first adapter includes an axial surface configured to face the first outer race along the first center axis with a gap in a state where the first outer race is press-fitted in the first adapter, and
the axial surface is provided at the first seal supporting portion.

11. The bicycle bottom bracket assembly according to claim 1, wherein
the first adapter comprises a resin material.

12. The bicycle bottom bracket assembly according to claim 1, further comprising:
a crank shaft including a first groove configured to contact the first rolling elements.

13. The bicycle bottom bracket assembly according to claim 1, wherein
the second adapter comprises a resin material, and
the second outer race is partly embedded in the second adapter to be prevented from moving relative to the second adapter in the both axial directions along the second center axis.

14. The bicycle bottom bracket assembly according to claim 13, wherein
the second outer race is partly embedded in the second adapter by an integral molding process.

* * * * *